United States Patent
Weiner et al.

(10) Patent No.: US 7,116,419 B1
(45) Date of Patent: Oct. 3, 2006

(54) WAVELENGTH-PARALLEL POLARIZATION MEASUREMENT SYSTEMS AND METHODS

(75) Inventors: Andrew M. Weiner, West Lafayette, IN (US); Xiang Wang, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 421 days.

(21) Appl. No.: 10/705,119

(22) Filed: Nov. 11, 2003

Related U.S. Application Data

(60) Provisional application No. 60/426,559, filed on Nov. 15, 2002.

(51) Int. Cl.
G01J 4/00 (2006.01)

(52) U.S. Cl. .................................. 356/364
(58) Field of Classification Search ............ None
See application file for complete search history.

(56) References Cited

U.S. PATENT DOCUMENTS

| | | | |
|---|---|---|---|
| 4,681,450 A | 7/1987 | Azzam | |
| 6,043,887 A | 3/2000 | Allard et al. | |
| 6,552,836 B1 * | 4/2003 | Miller | 359/237 |
| 7,027,198 B1 * | 4/2006 | Yao | 359/259 |
| 2002/0044282 A1 | 4/2002 | Moeller et al. | |
| 2004/0130717 A1 * | 7/2004 | Drevillon et al. | 356/364 |

OTHER PUBLICATIONS

Moeller et al., "SOP and PMD monitoring with WDM polarimeter," *Electronics Letters*, vol. 38, No. 12, Jun. 2002, pp. 583-58.
Kliger et al., "Polarized Light in Optics and Spectroscopy," Academic Press, 1990, pp. 59-61; 76-85; 92-97; 100-101.
Clarke et al., "Polarized Light and Optical Measurement," Pergamon Press, 1971; pp. 118-131.
Press Release, "dBm Optics Introduces the Fastest and Most Accurate PDL-vs.-Wavelength Measurement Available," dBm Optics, Inc., dated Mar. 22, 2002.
Thorlabs, Inc.—Viewing: Polarimeters, PA430-EC [online], undated [retrieved on Nov. 6, 2003]. Retrieved from the Internet: http://www.thorlabs.com/ProductDetail.cfm?DID=6 &ObjectGroup_ID=40&Product_ID=1283.
"Polarimeter Operating Manual," © 1998, Thorlabs, Inc., Rev. B Apr. 4, 2001, pp. 1-30.
Kaminow et al. (eds).,*Optical Fiber Telecommunications IIIA*, Academic Press, 1997, pp. 114-131.
Bass et al. (eds.), *Handbook of Optics*, 2nd ed., McGraw-Hill, Inc., 1995, vol. II, "Devices, Measurements, and Properties," pp. 22.3-22.23.
"Polarization Measurements of Signals and Components, Product Note 8509-1" © 1993, 2000, 2001, printed Jun. 21, 2002, pp. 1-24.

* cited by examiner

*Primary Examiner*—Michael P. Stafira
(74) *Attorney, Agent, or Firm*—William F. Bahret

(57) ABSTRACT

Systems and methods for measuring the state of polarization (SOP) for each wavelength channel in a multi-wavelength-channel light beam are disclosed. The system includes a set of two or more rapidly switchable waveplates switched to form a sequence of secondary light beams having different polarizations. A polarizer filters the set of secondary light beams, and a spectral dispersing element spatially divides the secondary light beams into their respective wavelength components. A detector array measures in parallel the intensity of the different wavelength components for each of the polarization-filtered light beams. A controller stores the intensity measurements and calculates the Stokes parameters for each wavelength component, thereby characterizing the SOP for all the wavelength channels of the multi-wavelength light beam.

30 Claims, 9 Drawing Sheets

WAVELENGTH-PARALLEL POLARIZATION MEASUREMENT SYSTEMS AND METHODS

CLAIM OF PRIORITY

This patent application claims priority of U.S. Provisional Patent Application No. 60/426,559, filed on Nov. 15, 2002, which application is hereby incorporated by reference.

GOVERNMENT LICENSING RIGHTS

The U.S. Government has a paid-up license in this invention and the right, in limited circumstances, to require the patent owner to license others on reasonable terms as provided for by the terms of Contract No. 0140682-ECS awarded by the National Science Foundation.

CROSS-REFERENCE TO RELATED APPLICATIONS

This application is related to U.S. patent application Ser. No. 10/705,159, entitled "Systems and Methods for Performing Wavelength-Parallel Polarization Measurements," filed on the same day as the present application and hereby incorporated by reference.

FIELD OF THE INVENTION

The present invention relates to measuring the polarization of a light beam, and in particular, to systems and methods for measuring the polarization states of the different wavelengths of a multi-wavelength light beam.

BACKGROUND OF THE INVENTION

Optics plays a key role in enabling today's information technology revolution by providing a means for high bandwidth communications. Optical transmission bandwidths have been increasing at rates exceeding the famous Moore's Law of the semiconductor electronics industry. Single channel data rates of 10 Gb/s are common, and 40 Gb/s systems are on the horizon. Wavelength division multiplexing (WDM) allows for transmitting multiple (i.e., tens or even hundreds) of lightwave signals at different wavelengths ("wavelength channels") over the same optical fiber. To date, WDM techniques having data transmission rates exceeding 1 Tb/s have been demonstrated.

To sustain this growth, new technologies are needed both to monitor and to mitigate new transmission impairments attendant with rapidly increasing data rates. In particular, effects related to the polarization state of light (i.e., the orientation of the electric field vector associated with the lightwave signal) have recently emerged as key issues in extending the performance of lightwave systems. The state of polarization (SOP) of light emerging from a length of single-mode optical fiber is usually scrambled, even for input light with a well defined SOP. This polarization scrambling results from very small and essentially random perturbations to the circular symmetry of long fiber optic cables arising both from the manufacturing process and from environmental perturbations.

Polarization effects impact lightwave system performance in several important ways. For example, polarization-dependent loss (PDL) occurs because transmission, reflection, and diffraction of light from optical components is typically a function of polarization. Thus, the PDLs of the individual components of a lightwave system combine to affect system performance, particularly since the SOP may be scrambled between the different components. Lightwave systems must therefore be designed to withstand even worst-case PDL effects. Resulting system impairments from PDL can be mitigated either by reducing the PDLs of individual components (which usually adds cost) or by measuring, characterizing and controlling the SOP within the lightwave system.

Also, in some wavelength-division multiplexed (WDM) communication systems (e.g., undersea lightwave transmission systems), adjacent wavelength channels are orthogonally polarized. This allows neighboring channels to be separated both on the basis of wavelength and polarization, and enables closer channel spacing (in wavelength) than would be possible without the use of orthogonal polarizations. On the other hand, any frequency-dependent polarization scrambling that degrades the orthogonality of adjacent channels leads to polarization cross-talk and impaired system performance. Therefore, the wavelength-dependent polarization behavior of such systems must be measured, characterized and controlled.

Further, polarization scrambling in fiber optic propagation arises from random birefringence in the fiber. Random birefringence in optical fibers may be modeled as a series of randomly oriented wave plates, each of which induces a small differential delay between the polarization components aligned along the fast and slow waveplate axes. The output signal experiences wavelength-dependent polarization scrambling, as well as a wavelength-dependent and input-polarization-dependent delays. These polarization-mode dispersion (PMD) effects lead to random signal fading and increased digital error rates. PMD is already seen as an important adverse effect in today's 10 Gb/s per channel lightwave systems and as a key limiting impairment in industry's quest to move to 40 Gb/s and beyond. The dominant scheme for PMD compensators requires measuring the SOP, manipulating the SOP, and then introducing a controlled polarization-dependent delay.

It is known that a polarized light beam is completely defined by the four Stokes parameters $S_0$, $S_1$, $S_2$ and $S_3$. The parameter $S_o$ is the total power (e.g., intensity) of the beam. The parameter $S_1$ is the relative power of the vertical versus horizontal polarization component. The parameter $S_2$ is the relative power of the +45° polarization component versus the −45° polarization component. The parameter $S_3$ is the relative power of the right-circular polarization component versus the left-circular polarization component.

In all of the above examples, measuring the SOP (e.g., via determination of the Stokes parameters) is important. However, present day lightwave polarization measurement systems have significant shortcomings for WDM optical communications mainly because they can only measure one wavelength channel at a time.

By way of example, FIG. 1A is a schematic diagram of a prior art polarization measurement system 10. System 10 includes three polarization-independent beam splitters 14 and two mirrors 16, arranged as shown, that break up an input polarized light beam 18 into four separate polarized beams 20A, 20B, 20C and 20D. These four beams are used to separately measure the four Stokes parameters. System 10 includes polarizers 22A, 22B, 22C and 22D placed in the path of beams 20A, 20B, 20C and 20D aligned respectively at 0°, 45°, 90°, and 0°. Associated with and arranged upstream of polarizer 22D is a quarter wave plate 24 so that circularly polarized light (e.g., right-hand circular polarization) can be measured. System 10 includes four photodetectors 30A, 30B, 30C and 30D respectively arranged immediately downstream of polarizers 22A, 22B, 22C and 22D. Photodetectors 30A, 30B, 30C and 30D are each connected to a controller 40.

Measuring the intensity of each of polarized beams 20A, 20B, 20C and 20D with respective detectors 30A, 30B, 30C and 30D allows the four Stokes parameters to be measured, which in turn allows the SOP of input beam 18 to be completely determined (i.e., "characterized"), e.g., by computation in controller 40.

FIG. 1B is a schematic diagram of another prior art polarization measurement system 50 that is more compact than system 10 of FIG. 1A. System 50 includes, in order along an axis A1, a set 56 of adjustable (i.e., movable) waveplates 60, a polarizer 66 with a fixed orientation, and a photodetector 70 coupled to a controller 80. Waveplates 60 are adjusted (e.g., variable-thickness plates are moved relative to one another to vary the overall retardation) to obtain the four polarization orientations needed to calculate the Stokes parameters. The intensity measurements for each setting of adjustable waveplates 60 are made sequentially by detector 70 and stored in controller 80. When the measurements for each setting are completed, the Stokes parameters for polarized light beam 18 are calculated.

While prior art polarization measurement systems such as those described above are suitable for measuring one wavelength channel at a time, they are unsuitable for lightwave transmission systems that employ multiple wavelengths. Because the trend in lightwave communications is to multiplex and transmit optical signals (i.e., lightwaves) having multiple (e.g., tens or hundreds of) wavelengths, there is a need for systems and methods that allow for quickly measuring and characterizing the SOP for each of the different wavelengths (i.e., wavelength channels) in the multi-wavelength beam.

SUMMARY OF THE INVENTION

An aspect of the invention is a system for measuring the state of polarization (SOP) of wavelength components in a multi-wavelength input light beam. The system includes a set of two or more rapidly switchable waveplates selectively controllable to receive and operate on the input light beam to form a sequence of secondary light beams with different polarizations. The system includes a polarizer oriented to pass a select polarization and arranged to receive the secondary light beams and form a corresponding first sequence of polarization-filtered light beams. The system further includes a first spectral dispersing element arranged to spatially disperse the wavelengths components of one of the input light beam, the secondary light beams and the polarization-filtered light beams. The system also has a first detector array arranged to receive and detect the spatially dispersed wavelength components of each of the polarization-filtered light beams.

Another aspect of the invention is a method of measuring the state of polarization (SOP) of an input light beam having multiple wavelength components. The method includes rapidly forming from the input light beam a sequence of secondary light beams each with a different polarization, polarization-filtering the secondary light beams, spatially dispersing the wavelength components of the input light beam, the secondary light beams and/or the polarization-filtered light beams, measuring in parallel the intensities of the wavelength components for each polarization-filtered light beam, and then calculating the SOP for each wavelength component from the measured intensities.

DETAILED DESCRIPTION OF THE INVENTION

The present invention is a wavelength-parallel polarization measurement system capable of simultaneously and rapidly measuring the SOP for each wavelength component (i.e., wavelength channel) of a multi-wavelength light beam. In an example embodiment, the system performs the polarization measurements in about one millisecond or less. In an example embodiment, the system performs parallel polarization measurements of hundreds of wavelength channels with minimal total optical power requirements, e.g., on the order of a milliwatt or less. Because no mechanical movements are required to make a measurement, the system is capable of precise and repeatable measurements for each wavelength channel. In addition, the multi-wavelength input beam can be either a guided lightwave or a free-space light beam. The term "light beam" is used in the description below for the sake of clarity, and includes both a free-space light beam and a guided lightwave.

The ability to simultaneously measure the SOP for each of a large number of wavelengths allows compensating for adverse polarization effects in high-bandwidth (e.g., >10 GHz) multi-wavelength (e.g., WDM) optical transmission systems. The 1 millisecond data acquisition time capability (meaning that the polarization states of all the wavelength components are measured in parallel in <1 millisecond) of the present invention is suitable for use with polarization controllers and PMD compensators.

It is generally thought that compensators for time-varying PMD effects need to respond within milliseconds to handle most environmentally caused polarization effects. Therefore, the polarization measurement systems necessary for performing polarization feedback and control also need to respond on the millisecond scale. The ability to sense 100 wavelengths or more in under 1 millisecond corresponds to at least $10^5$ measurements per second. The total optical power capability of 1 milliwatt or less corresponds to only 10 microwatts per wavelength channel, which fits within the power range for typical optical fiber amplifiers and fiber communication systems.

The present invention is first described in terms of its generalized example embodiments. Specific example embodiments are then set forth for the sake of illustration.

Generalized Example Embodiment with Single Detector Array

Figure 1A:
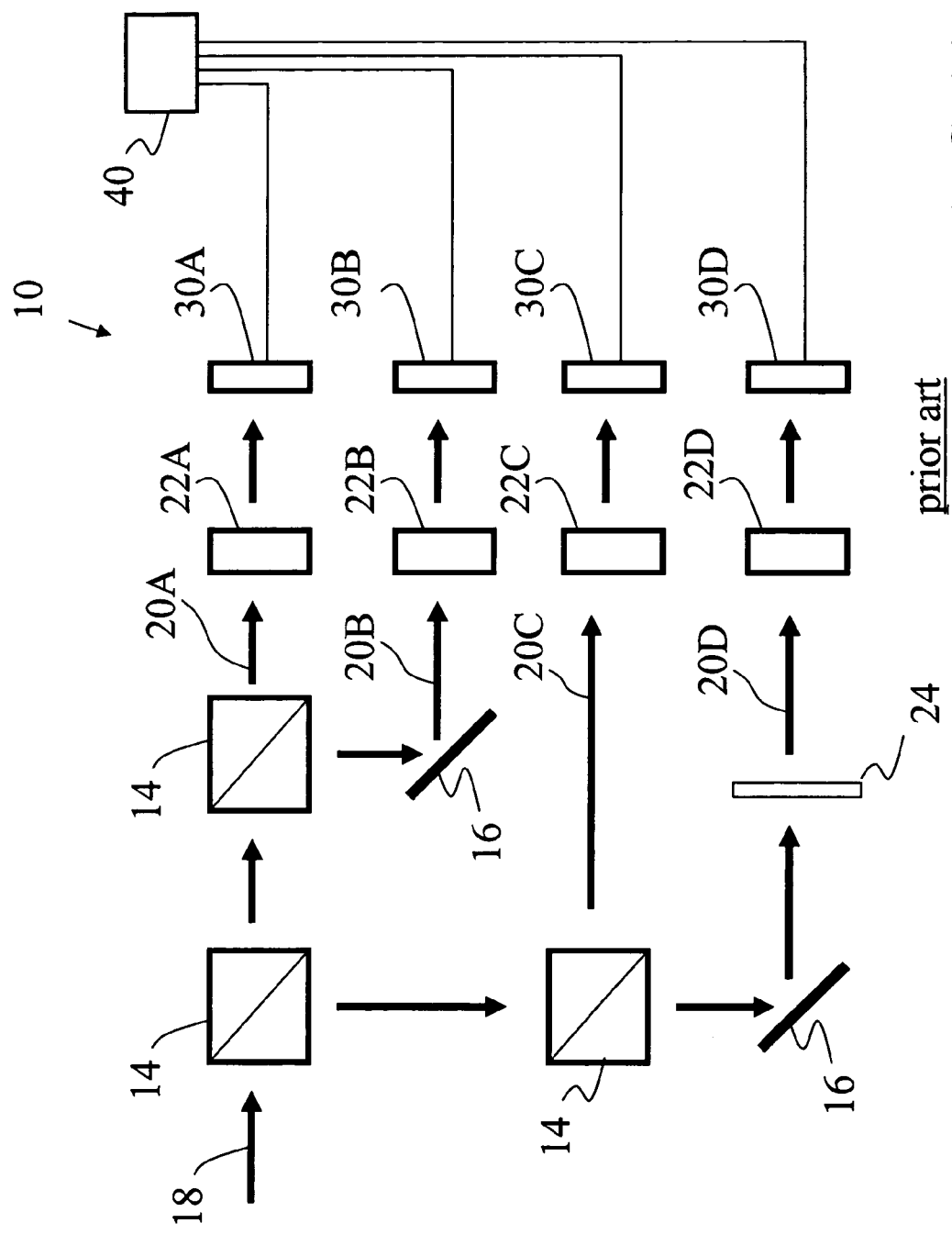
FIG. 1A is a schematic diagram of an example prior art polarization measuring system that breaks up a polarized light beam into four different light beams to measure the four Stokes parameters at a single wavelength using four separate photodetectors.
Figure 1B:
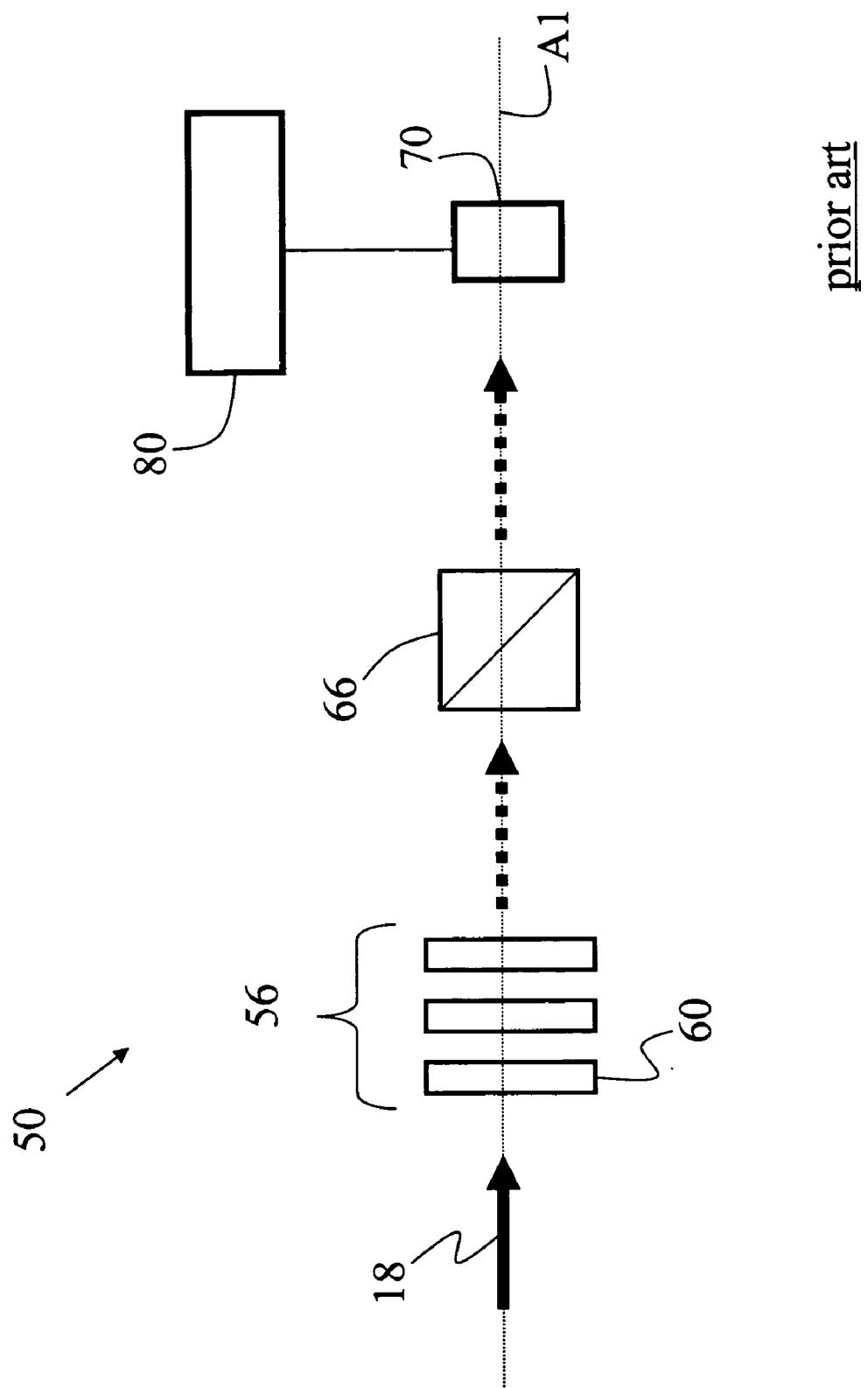
FIG. 1B is a schematic diagram of an example prior art polarization measuring system that utilizes a single photodetector and a set of adjustable waveplates to measure the state of polarization (SOP) at a single wavelength.
Figure 2:
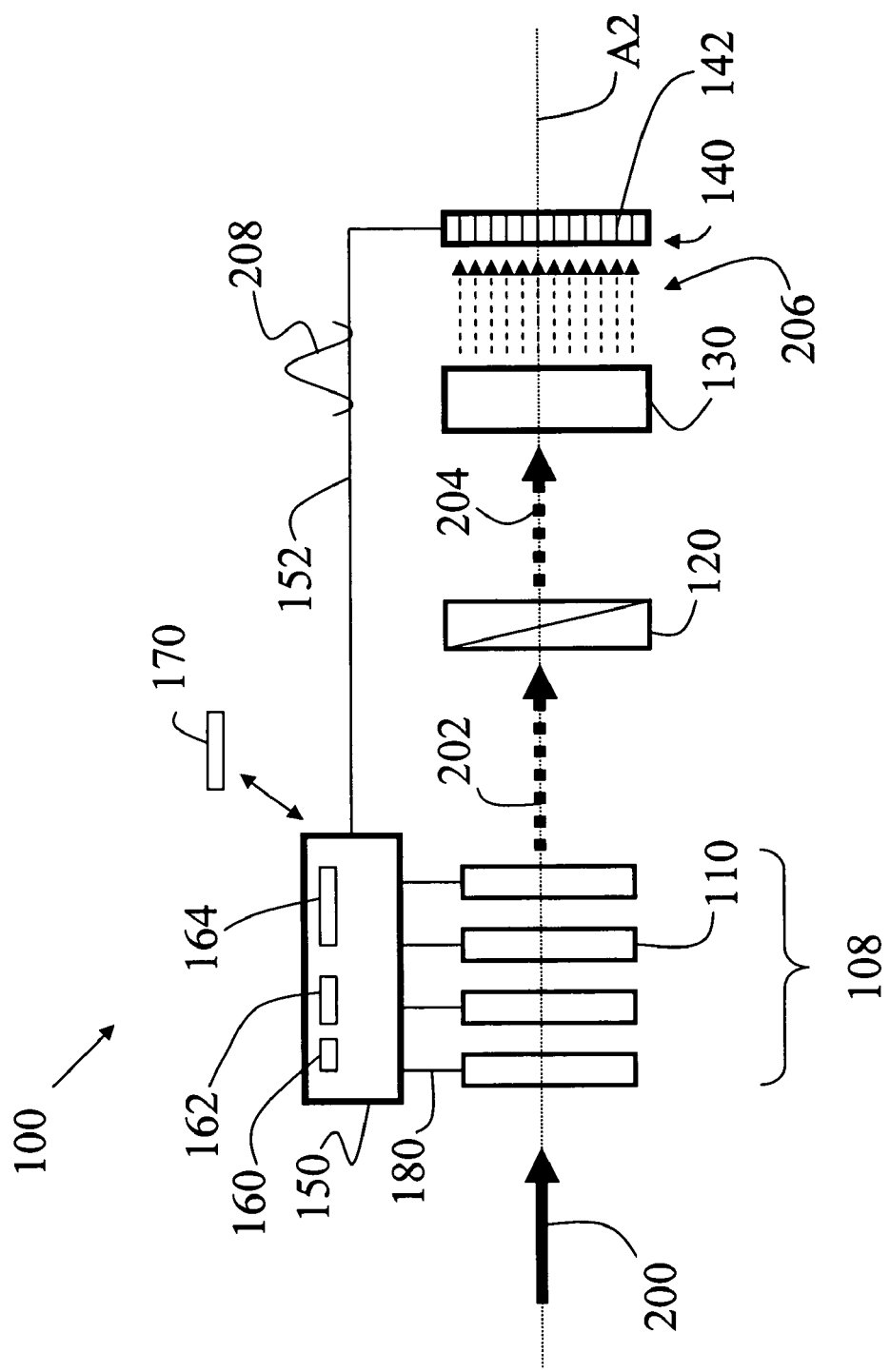
FIG. 2 is a schematic diagram of a generalized embodiment of the wavelength-parallel polarization measurement system of the present invention that employs a set of switchable waveplates, a spectral dispersing element and a single detector array.

FIG. 2 is a schematic diagram of a generalized embodiment of the wavelength-parallel polarization measurement system 100 of the present invention. System 100 includes, in order along an optic axis A2, a set 108 of rapidly switchable waveplates 110, a polarizer 120 with a select orientation (e.g., oriented 0° to pass horizontally polarized light), a spectral dispersing element 130, and a detector array 140 made up of individual detector elements (e.g., pixels) 142. In the context of the present invention, one skilled in the art will appreciate that the frame of reference for measuring polarization can be adjusted arbitrarily to define specific orthogonal directions as "horizontal" and "vertical." Horizontal polarization is used herein as an example of a selected polarization and for the sake of providing a reference orientation from which to measure other polarization directions and optic axis orientations. Thus, the term "horizontal" is not meant to be limited to an absolute orientation or frame of reference with respect to measurement system 100.

Spectral dispersing element 130 includes one or more of a number of known elements capable of spatially separating the wavelength components (i.e., wavelength channels) of a multi-wavelength light beam. In example embodiments, spectral dispersing element 130 includes one or more of: a diffraction grating (e.g., a reflective grating, a transmissive grating, an amplitude grating, a phase grating, a holographic grating, an echelle grating, an arrayed waveguide grating, etc.), a chromatic prism, and a virtually imaged phased array (VIPA). VIPAs are described in, for example, M. Shiraski, Opt. Lett., 21, 366 (1996), and Shiraski et al., IEEE Phot. Tech. Lett., 11, 1443 (1999). In an example embodiment, spectral dispersing element 130 includes or is used in combination with a curved mirror or a lens.

Also, the location of spectral dispersing element 130 immediately adjacent detector array 140, while preferred, is not absolutely necessary. Locating spectral dispersing element 130 immediately adjacent detector array 140 is generally preferred as it makes for a more compact system because the light beam remains undispersed until the last possible moment prior to being detected.

Thus, spectral dispersing element 130 can be placed upstream of polarizer 120. However, in certain embodiments it is advantageous that it be placed downstream of the polarizer so that it sees light of only one polarization. This is important because certain spectral dispersing elements such as diffraction gratings have strong polarization-dependent loss. Such loss distorts the state of polarization of incoming light. Thus, placing spectral dispersing element 130 after polarizer 120 enables the use of high spectral dispersion gratings.

In an example embodiment, detector array 140 is a photodetector array with a response time of 0.1 millisecond or less, and preferably 0.05 milliseconds or less. In another example embodiment, detector array 140 is a linear photodiode array having 8, 16, 32, 64, 128, 512 or 1024 detector elements 142. In another example embodiment, detector array 140 is an InGaAs linear detector array having a total line time (i.e., read-out time plus exposure time) of about 50 microseconds. A specific example of a detector array 140 suitable for use in system 100 is InGaAs Line Scan Camera Model#: SU256LX/A/H from Sensors Unlimited, Inc., Princeton, N.J.

Detector array 140 is coupled to a controller 150 via line 152. In an example embodiment, controller 150 is a computer having a processor 160, a memory device 162, and a data storage unit 164, all electrically interconnected. Data storage unit 164 may be, for example, a hard drive, a CD-ROM drive, or a floppy disk drive that contains or is capable of accepting and reading instructions stored on a computer-readable medium 170 (e.g., a CD or floppy disk).

Controller 150 is also coupled to each switchable waveplate 110 in waveplate set 108 via lines 180. In an example embodiment, switchable waveplates 110 are electrically switchable electro-optical or magneto-optical elements. In a more specific example embodiment, switchable waveplates 110 are ferroelectric liquid crystal (FLC) cells, or simply "FLCs." Suitable FLCs are available, for example, from Displaytech, Inc., Longmont, Colo. FLCs act as fixed-thickness retarders (i.e., waveplates) with an optic axis orientation rapidly switchable (i.e., at about 0.1 millisecond) between two stable states.

It is worth noting that a nematic liquid crystal, which has a fixed optic axis orientation and switchable retardation, has a response time on the order of tens of milliseconds. This switching time is too slow by an order of magnitude for modern polarization measurement applications. The switchable waveplates 110 of the present invention are rapidly switchable, i.e., have switching times of 0.1 millisecond or faster.

Figure 3B:
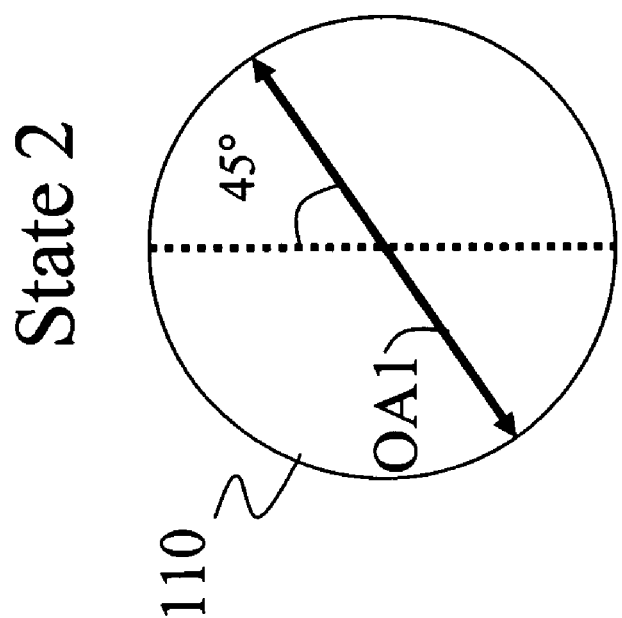
FIG. 3B is a schematic diagram illustrating a second state of the optic axis orientation of the switchable waveplate of FIG. 3A.
Figure 3A:
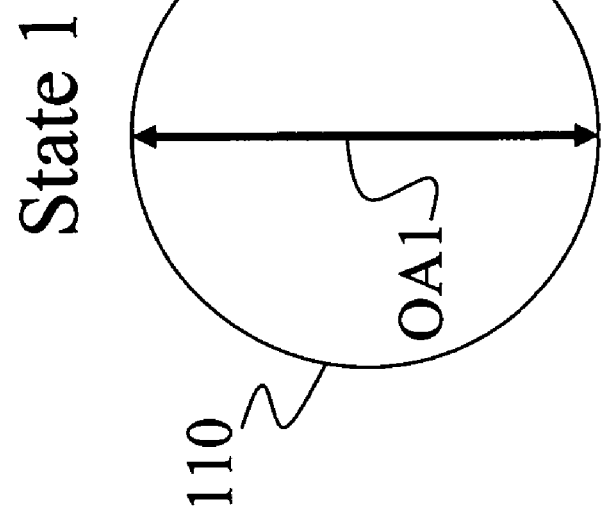
FIG. 3A is a schematic diagram illustrating a first state of the optic axis orientation of a switchable waveplate.

In an FLC, the liquid crystal behaves as a uniaxial birefringent medium with its optic axis in the plane of the layer. With reference to FIG. 3A, when an electric field is applied to FLC waveplate 110, its optic axis OA1 assumes a uniform direction throughout the layer, referred to as "State 1." With reference now to FIG. 3B, when the polarity of the electric field is reversed, the optic axis OA1 rotates by approximately 45° relative its orientation in State 1, forming a "State 2." Thus, FLC waveplate 110 has two defined stable states that are determined by the polarity of the applied electric field as controlled by controller 150 (FIG. 2). The magnitude of the switchable retardance of FLC waveplate 10 is determined by its thickness.

It is noted here that waveplates in general, and FLCs in particular, do not switch at exact angles. Thus, in the discussion hereinbelow and in the claims, it will be understood that a given optic axis angle for switching is not exact but rather is to be considered approximate to or "substantially" the given angle to a degree consistent with the non-ideality of the device.

Figures 3C, 3D:
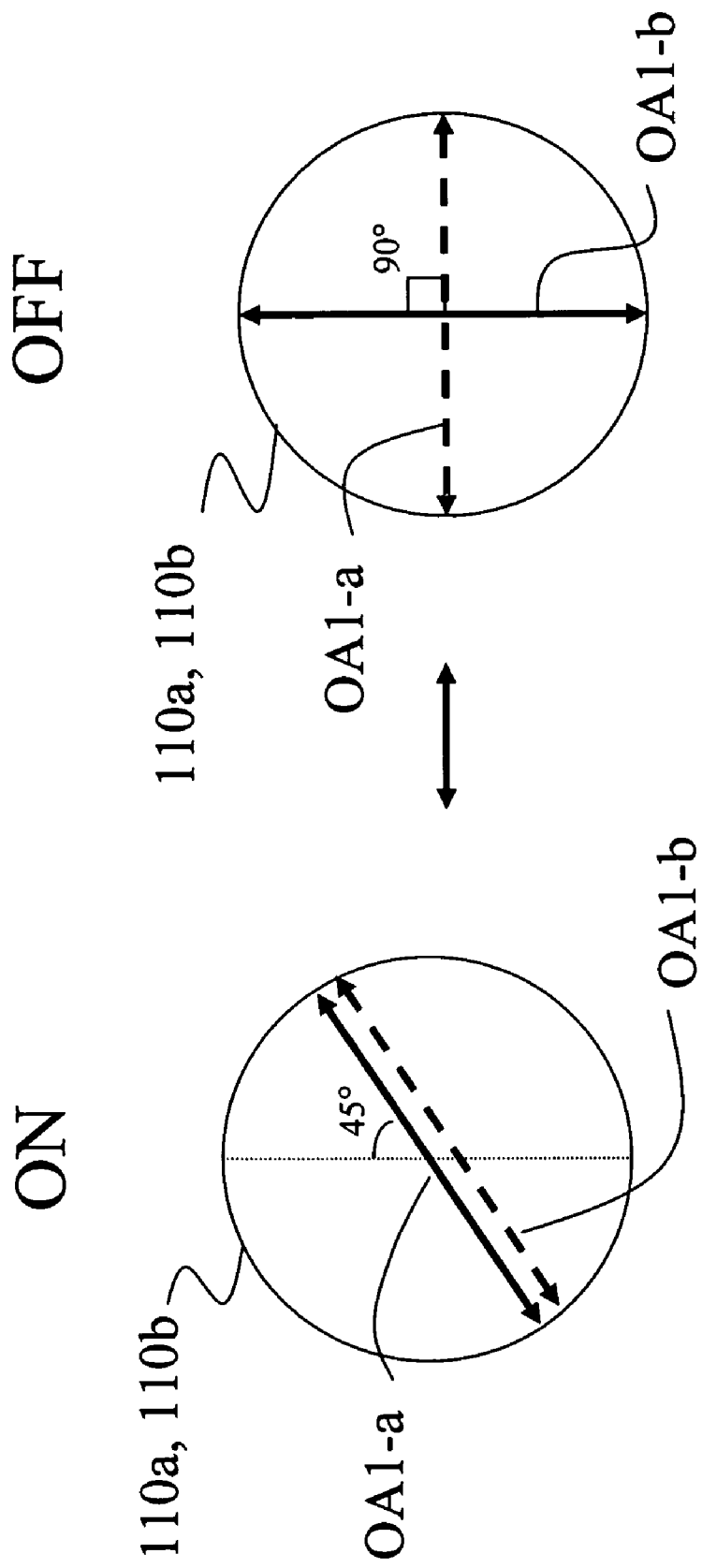
FIG. 3C is a schematic diagram illustrating the ON state of a waveplate pair showing the parallel orientations of the optic axes.
FIG. 3D is a schematic diagram illustrating the OFF state of the waveplate pair of FIG. 3C, showing the perpendicular orientations of the optic axes.

In an example embodiment, switchable waveplates 110 are combined to achieve a select retardance. FIGS. 3C and 3D show a front-view of two combined waveplates 110a and 110b, with the respective optic axes OA1-a and OA1-b shown in solid and dashed lines.

For example, consider waveplates 110a and 110b in FIGS. 3C and 3D to be two λ/8 waveplates. These can be combined to emulate a λ/4 waveplate switchable between first and second (e.g., ON and OFF) stable states. Waveplates 110a and 110b are aligned so that in the ON state, the optic axes of both waveplates are parallel to each other (FIG. 3C), while in the OFF state the optic axes are perpendicular (FIG. 3D).

When optical axes OA1-a and OA1-b are parallel, the retardances of the waveplates add, resulting in a net λ/4 retardance (the ON state). When the optical axes are perpendicular, the two retarders exactly cancel each other, giving net zero retardance (the OFF state). The effect in the OFF state is as if waveplates 110a and 110b have been removed from the beam.

This same technique can be used to assemble an on-off switchable λ/2 plate by combining a pair of λ/4 switchable waveplates.

Method of Operation

With reference again to FIG. 2, the operation of system 100 in measuring the SOP of each wavelength component of a multi-wavelength light beam 200 is now described. Multi-wavelength input light beam 200 is first incident on set 108 of switchable waveplates 110. The retardance of switchable waveplates 110 is rapidly varied according to a select measurement protocol to create a (time) sequence (set) of secondary light beams 202 (illustrated by a dashed arrow) with different polarizations. In an example embodiment, secondary light beams 202 includes at least one beam whose polarization remains unmodified, i.e., is the same as that of input light beam 200.

In an example embodiment, input beam 200 is modified 3 times so that the combination of waveplates 110 and polarizer 120 provide the same effect as a rotatable polarizer with a quarterwave plate capable of measuring 0° (horizontal), 45°, 90°(vertical) and right-hand circular polarizations. However, instead of using the polarizer-quarterwave-plate pair, the polarization of input beam 200 is changed via switchable waveplates 110. In an example embodiment, the switching operation includes putting combined waveplates 110 in the OFF state, in effect removing them from the system. This operation is not possible for a single waveplate 110.

Secondary light beams 202 sequentially pass through polarizer 120, which has a select orientation and acts as a polarization filter. This results in the creation of a sequence (set) of polarization-filtered light beams 204. Light beams 204 then sequentially encounter spectral dispersing element 130, which spatially separates each of the polarization-filtered light beams into their wavelength components 206.

The spatially separated wavelength components 206 for each of the polarization-filtered light beams 204 are then incident upon detector array 140, where the wavelength components are measured in parallel by spatially separated detector elements 142. For example, consider the case where controller 150 operates to switch waveplates 110-1 and 110-2 (see FIG. 7) to create a sequence of secondary light beams 202 that represent the four different polarization states 0°, 45°, 90° and right-handed circular (RHC) polarizations. In this case, four parallel measurements of the wavelength components of the corresponding polarization-filtered light beams 204 are made in sequence, with one parallel measurement being made for each of the four different polarization states.

Controller 150 controls the switching rate of waveplates 110 so that detector array 140 has time to detect the frequency components 206 from each beam 204. In an example embodiment, controller 150 controls the waveplate switching rates to be one millisecond or less. In another example embodiment, controller 150 controls the waveplate switching rates to be 0.25 millisecond or less.

Detector array 140 sends to controller 150 over line 152 electrical signals 208 corresponding to the detected wavelength components. Controller 150 processes electrical signals 208 (e.g., in processor 160) to calculate SOP for each wavelength component of input beam 200. In an example embodiment, this is accomplished by storing the data represented by the electrical signals in data storage unit 164 and then processing the data using processor 160 to calculate the Stokes parameters. In an example embodiment, line 152 is a bus and electrical signals 208 are sent in parallel to controller 150 via the bus to ensure rapid measurement of the SOPs. In another example embodiment, electrical signals 208 are processed in real-time e.g., using processor 160.

Two Detector Generalized Embodiment

Wavelength-parallel polarization measurement system 100 of FIG. 2 is capable of sub-millisecond polarization measurements of multiple wavelengths. However, if increased measurement speed is required, the data acquisition time can be further reduced by modifying system 100. In an example embodiment illustrated in FIG. 4, the modification includes using a beam-splitting polarizer (e.g., a polarizer cube) 120 and adding a second dispersing element 230 and second detector array 240 along the polarizer's reflection axis A2. Detector array 240 is coupled to controller 150 and detects spatially separated wavelength components 244 of a second set of secondary light beams 246 reflected from polarizer 120. Light beams 246 have polarizations orthogonal to the corresponding light beams in transmitted secondary light beams 204. This arrangement eliminates a measurement step, which cuts the total measurement time by about one-quarter. Another advantage of the two-detector embodiment of FIG. 4 is that more of the input light is collected, which improves the signal to noise ratio of the measurement.

Figure 4:
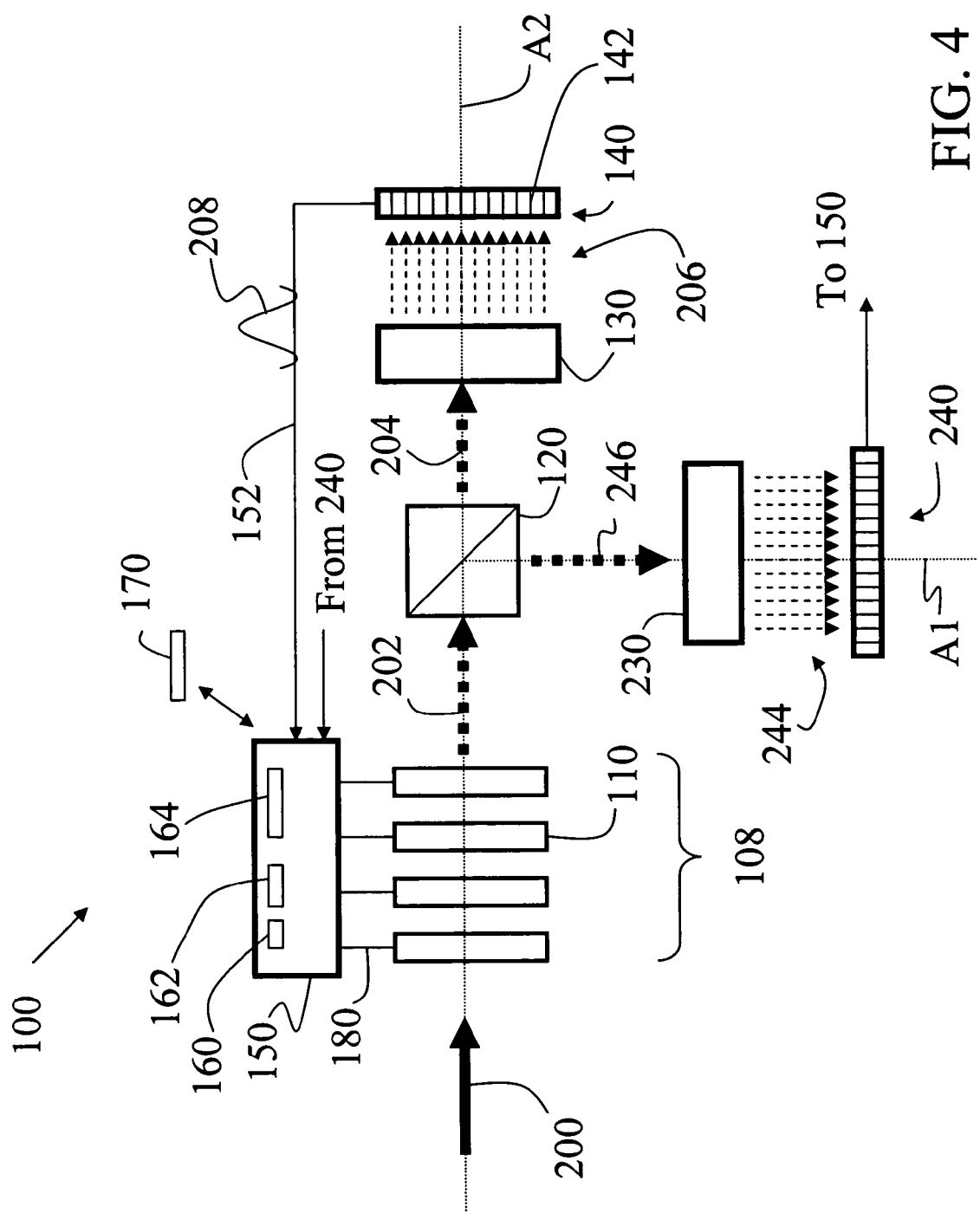
FIG. 4 is a schematic diagram of a generalized embodiment of the polarization measurement system of the present invention similar to that of FIG. 2, but that employs two detector arrays.

In an example embodiment of system 100 of FIG. 4, a single spectral dispersing element 130 is employed and arranged upstream of polarizing beam splitter 120.

System with Three Pairs of Switchable Waveplate

Figure 5:
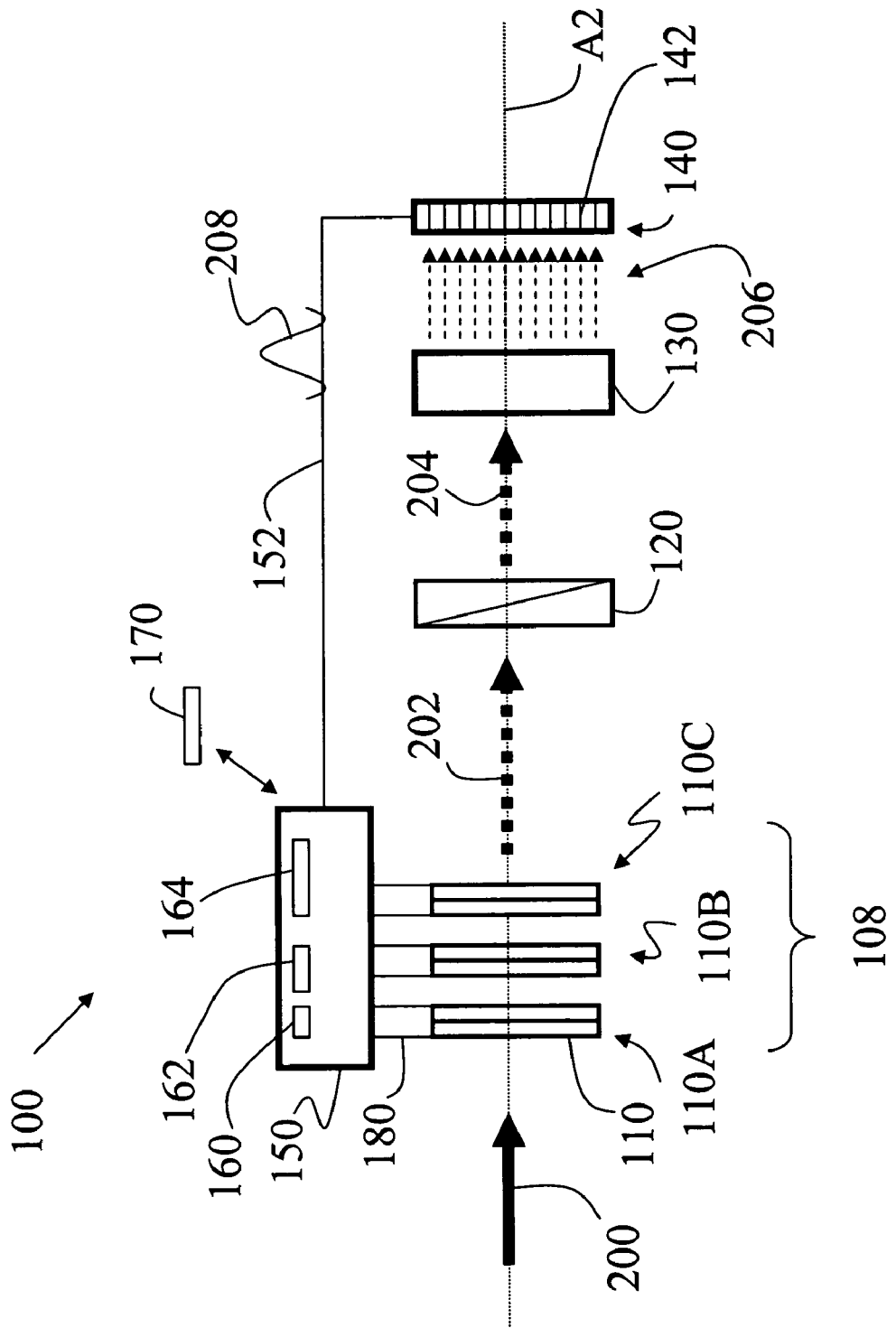
FIG. 5 is a schematic diagram of an embodiment of the wavelength-parallel polarization measurement system of FIG. 2 that employs three pairs of switchable waveplates.

FIG. 5 is a schematic diagram of a specific example embodiment of the wavelength-parallel polarization measurement system 100 of FIG. 2 that employs three pairs 110A, 110B and 110C of switchable waveplates 110. Waveplate pair 110A constitutes a switchable λ/4 waveplate and has an optic axis oriented at 45°. Waveplate pair 110B constitutes a switchable λ/2 waveplate and has an optic axis oriented at 22.5°. Waveplate pair 110A constitutes a λ/2 waveplate and has an optic axis oriented at 45°. Polarizer 120 is oriented to pass a select (e.g., horizontal or 0°) polarization.

In the ON state, waveplate pair 110C acts as a λ/2 waveplate that converts vertically polarized light to horizontally polarized light. Further, waveplate pair 110B in the ON state acts as a λ/2 waveplate that converts 45° linearly polarized light to horizontally polarized light. Waveplate pair 110C in the ON state acts as a λ/4 plate that converts circularly polarized light to either horizontally or vertically polarized light, depending on the handedness of the circular polarization (i.e., right-handed or left-hand). Note that in their OFF states, each of the waveplate pairs 110A, 110B and 110C have no affect on the light passing therethrough for the reasons discussed above.

Table 1 sets forth an example SOP measurement protocol for system 100 of FIG. 5 that involves only four measurement steps.

TABLE 1

Four-Step Measurement Protocol for System of FIG. 5

| Measurement Step | State for λ/4 waveplate pair 110 A | State for λ/2 waveplate pair 110 B | State for λ/2 waveplate pair 110 C | Measurement Result |
|---|---|---|---|---|
| 1 | OFF | OFF | OFF | $I_0$ |
| 2 | OFF | OFF | ON at 45° | $I_{90}$ |
| 3 | OFF | On at 22.5° | OFF | $I_{45}$ |
| 4 | On at 45° | OFF | OFF | $I_{RHC}$ |

The measurements obtained using the measurement protocol of Table 1 provide the basic parameters (intensities) $I_0$, $I_{90}$, $I_{45}$ and $I_{RHC}$ to characterize the SOP of input beam 200 for each wavelength component using the equations listed below in Table 2.

TABLE 2

Polarization characterization via normalized Stokes parameters based on measurement of $I_0$, $I_{90}$, $I_{45}$ and $I_{RHC}$ $S_0 = I_0 + I_{90} = I_{TOT} = I_{45} + I_{135} = I_{RHC} + I_{LHC}$   $S_1 = (I_0 - I_{90})/I_{TOT}$
$S_2 = (I_{45} - I_{135})/I_{TOT} = (2I_{45}/I_{TOT}) - 1$   $S_3 = (I_{RHC} - I_{LHC})/I_{TOT} = (2I_{RHC}/I_{TOT}) - 1$ In an example embodiment, waveplates 110 making up waveplate pairs 10A, 110B and 110C are FLCs with switching times of about 100 microseconds or faster. Also in an example embodiment, detector array 140 is a photodiode array having a 50 microsecond readout time. Thus, in an example embodiment, the complete measurement cycle of Table 1 is performed in about 1 millisecond or less.

In an example embodiment, controller 150 is programmed to control the operation (i.e., selective switching) of waveplate pairs 110A, 110B and 110C according to the measurement protocol of Table 1, and is also programmed to calculate the Stokes parameters according to Table 2 for each wavelength component.

System with One Paired, Two Single Switchable Waveplates

Figure 6:
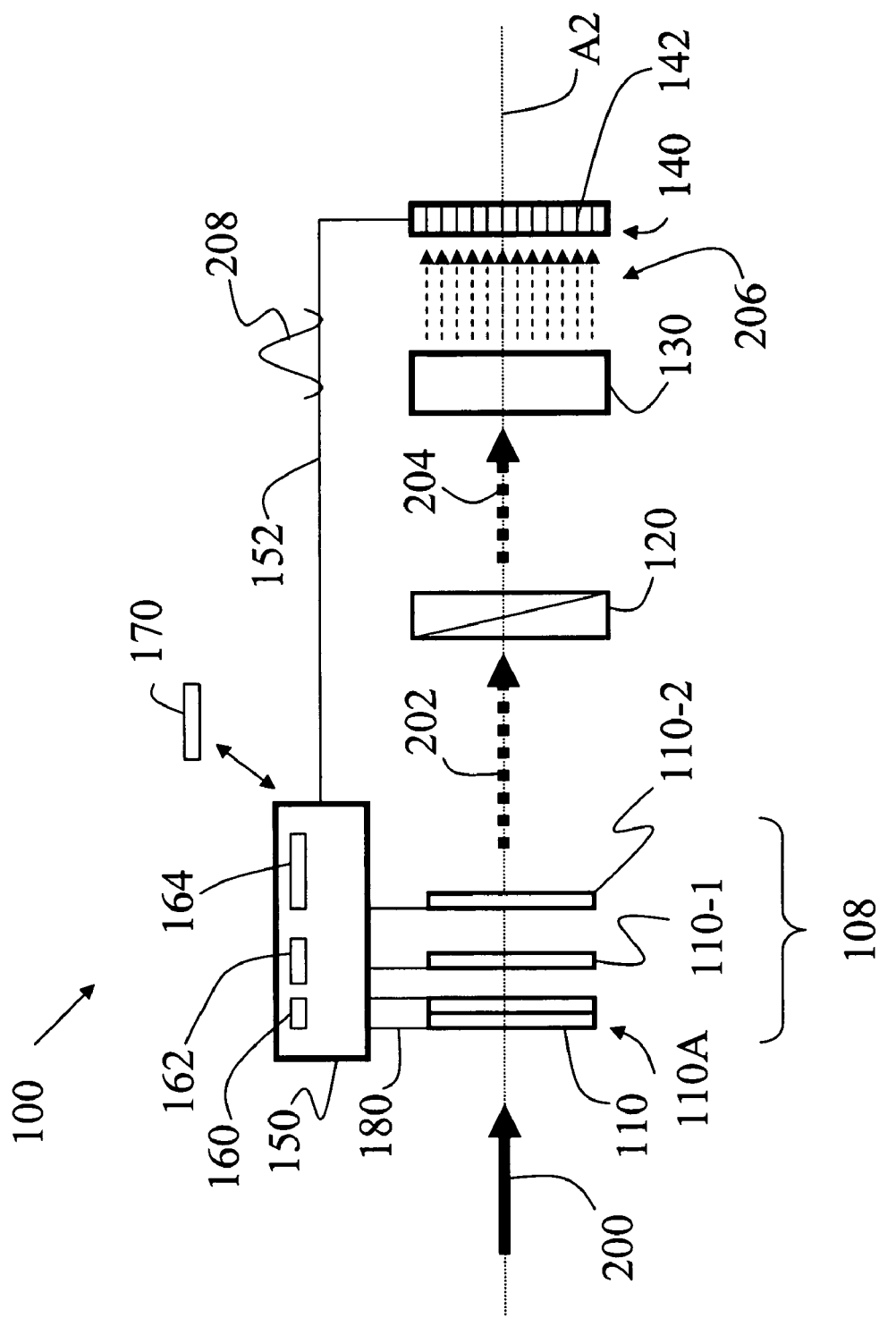
FIG. 6 is a schematic diagram of an embodiment of the wavelength-parallel polarization measurement system of FIG. 2 that employs one pair of switchable waveplates and two individually switchable waveplates.

FIG. 6 is a schematic diagram of a specific example embodiment of the wavelength-parallel polarization measurement system 100 of FIG. 2 that employs one pair 1110A of switchable waveplates 110, and two single switchable waveplates 110, identified as 110-1 and 110-2. Waveplate pair 110A is formed from two λ/4 switchable waveplates to constitute a switchable λ/2 waveplate with an optic axis oriented at 67.5°. Waveplate 110-1 is a single λ/2 waveplate with optic axis orientation switchable between 90° and 45°. Waveplate 110-2 is a single λ/4 waveplate with an optic axis orientation switchable between 90° and 45°. Polarizer 120 is oriented to pass a select (e.g., horizontal or 0°) polarization.

System 100 of FIG. 6 requires only four switchable waveplates 110. Characterizing the SOP of each wavelength component of multi-wavelength input beam 200 involves making the same intensity measurements (i.e., $I_0$, $I_{90}$, $I_{45}$ and $I_{RHC}$) and the same equations (Table 2) as used in connection with system 100 of FIG. 5. The advantage of system 100 of FIG. 6 over that of FIG. 2 is that it requires fewer waveplates, making it more cost effective and is more efficient (i.e., has less power loss).

Table 3 sets forth an example SOP measurement protocol for system 100 of FIG. 6.

TABLE 3

Four-Step Measurement Protocol for System of FIG. 5

| Measurement Step | State for λ/2 wave plate pair 110A | State for λ/2 waveplate 110-1 | State for λ/4 waveplate 110-2 | Measurement Result |
|---|---|---|---|---|
| 1 | OFF | 90° | 90° | $I_0$ |
| 2 | OFF | 45° | 90° | $I_{90}$ |
| 3 | ON at 67.5° | 45° | 90° | $I_{45}$ |
| 4 | OFF | 90° | 45° | $I_{RHC}$ |

Table 4 below is a Truth Table for system 100 of FIG. 6. The Truth Table of Table 4 shows all the waveplate states and the SOP after waveplate pair 110A and waveplates 110-1 and 110-2. Columns 2, 4 and 6 show the states of the waveplates at which the four different input polarization components are measured. Columns 3, 5 and 7 show the SOP of secondary set of light beams 202 after passing through the given waveplate/waveplate pair. Column 1 is the input SOP in degrees.

TABLE 4

Truth Table for the system of FIG. 6

| Input SOP | 110A | SOP | 110-1 | SOP | 110-2 | SOP | 0° output Intensity |
|---|---|---|---|---|---|---|---|
| 90° | OFF | 90° | 90° | 90° | 90° | 90° | 0 |
| 0° | OFF | 0° | 90° | 0° | 90° | 0° | 1 |
| 45° | OFF | 45° | 90° | 135° | 90° | LHC | ½ |
| 135° | OFF | 135° | 90° | 45° | 90° | RHC | ½ |
| RHC | OFF | RHC | 90° | LHC | 90° | 45° | ½ |
| LHC | OFF | LHC | 90° | RHC | 90° | 135° | ½ |
| 90° | OFF | 90° | 45° | 0° | 90° | 0° | 1 |
| 0° | OFF | 0° | 45° | 90° | 90° | 90° | 0 |
| 45° | OFF | 45° | 45° | 45° | 90° | RHC | ½ |
| 135° | OFF | 135° | 45° | 135° | 90° | LHC | ½ |
| RHC | OFF | RHC | 45° | LHC | 90° | 45° | ½ |
| LHC | OFF | LHC | 45° | RHC | 90° | 135° | ½ |
| 90° | OFF | 90° | 90° | 90° | 45° | LHC | ½ |
| 0° | OFF | 0° | 90° | 0° | 45° | RHC | ½ |
| 45° | OFF | 45° | 90° | 135° | 45° | 135° | ½ |
| 135° | OFF | 135° | 90° | 45° | 45° | 45° | ½ |
| RHC | OFF | RHC | 90° | LHC | 45° | 0° | 1 |
| LHC | OFF | N/C | 90° | RHC | 45° | 90° | 0 |
| 90° | ON at 67.5° | 45° | 45° | 45° | 90° | RHC | ½ |
| 0° | ON at 67.5° | 135° | 45° | 135° | 90° | LHC | ½ |
| 45° | ON at 67.5° | 90° | 45° | 0° | 90° | 0° | 1 |
| 135° | ON at 67.5° | 0° | 45° | 90° | 90° | 90° | 0 |
| RHC | ON at 67.5° | LHC | 45° | RHC | 90° | 135° | ½ |
| LHC | ON at 67.5° | RHC | 45° | LHC | 90° | 45° | ½ |

Figure 7:
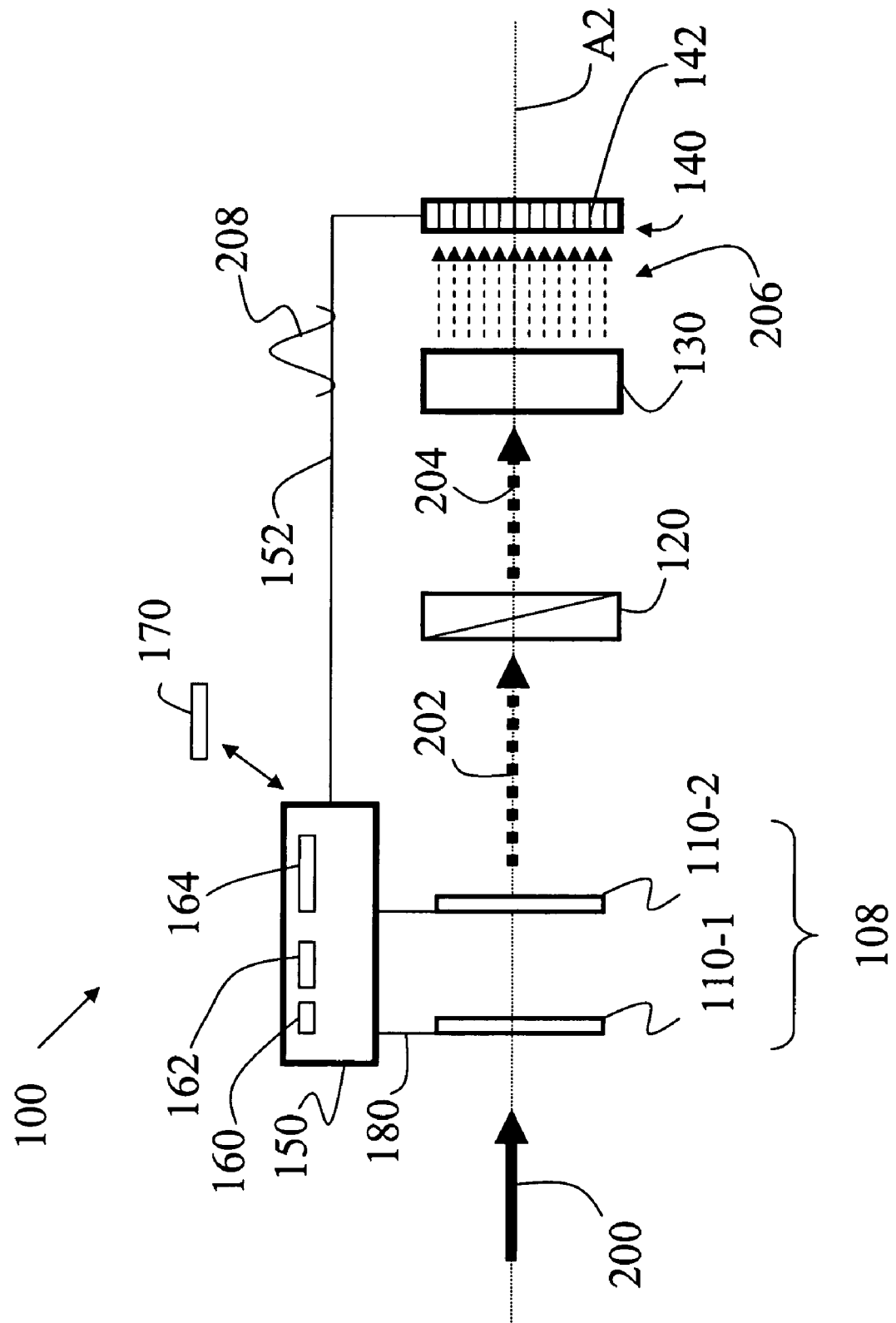
FIG. 7 is a schematic diagram of an embodiment of the wavelength-parallel polarization measurement system of FIG. 2 that employs two individually switchable waveplates.

System with two single switchable waveplates FIG. 7 is a schematic diagram of a specific example embodiment of the wavelength-parallel polarization measurement system 100 of FIG. 2 that employs only two single switchable waveplates 110- and 110-2. Waveplate 110-1 has λ/4 retardation and an optic axis orientation switchable between 90° and 135°. Waveplate 110-2 has λ/4 retardance and an optic axis orientation switchable between 180° and 135°. Polarizer 120 is oriented to pass a select (e.g., horizontal or 0°) polarization.

The two waveplate configuration of FIG. 7 is capable of completely characterizing the polarization of input beam 200 with four measurements. This configuration is also cost effective, has low optical power loss, and requires less time to take measurements than systems 100 of FIGS. 5 and 6.

Table 5 sets forth the measurement protocol for system 100 of FIG. 7.

TABLE 5

Measurement protocol for the system of FIG. 7

| Measurement Step | Single λ/4 switchable waveplate 110-1 | Single λ/4 switchable waveplate 110-2 | Measurement Result |
|---|---|---|---|
| 1 | 90° | 180° | $I_0$ |
| 2 | 135° | 135° | $I_{90}$ |
| 3 | 90° | 135° | $I_{45}$ |
| 4 | 135° | 180° | $I_{RHC}$ |

Using the SOP measurement protocol of Table 5, the four intensity components $I_0$, $I_{90}$, $I_{45}$, and $I_{RHC}$ are measured. The four Stokes parameters necessary for characterizing the polarization state for input beam 200 for wave wavelength are obtained by the relationships set forth in Table 2, above.

Table 6 is a Truth Table for the system of FIG. 7 that shows the SOP after each switchable waveplate.

TABLE 6

Truth Table for the system of FIG. 7

| Input SOP | Waveplate 110-1 | SOP | Waveplate 110-2 | SOP | 0° output Intensity |
|---|---|---|---|---|---|
| 0° | 90°* | 0 | 180° | 0° | 1 |
| 90° | 135° | RHC | 135° | 0° | 1 |
| 45° | 90° | RHC | 135° | 0° | 1 |
| RHC | 135° | 0 | 180° | 0° | 1 |

*fast axis = 90°

Error Correction

As mentioned above, switchable waveplates 110 in practice are not perfect, i.e., they do not switch at exactly their designed orientation and retardation, and their transmission is not 100%. Furthermore, their retardance varies as a function of wavelength. Accordingly, any discrepancy between the actual waveplate parameter values and the ideal assumed parameters leads to what is referred to herein as "SOP measurement errors." These "errors" are not fabrication errors per se, but rather are a result of the physics of using switchable waveplates at multiple wavelengths.

Thus, in an example embodiment, the present invention includes an error correction system and method to correct such errors. This allows for the tolerances on the switchable waveplates to be relaxed. In an example embodiment, the error correction method is embodied as a set of instructions in a computer readable medium to be executed by controller 150 (FIG. 2). The error correction scheme applies generally to the embodiments set forth above, and is described below in connection with system 100 of FIG. 7 for the sake of illustration.

Let the quantity $[S_{in}]$ be the Stokes parameters of the input light beam 200. Further, let [D] be the measured data that results from making a set of 4 measurements as specified by the measurement protocol of Table 5 (each measurement yields one value per wavelength). Both [D] and $[S_{in}]$ are vectors of length four. They are related by a linear transformation through a 4×4 measurement matrix [M]:

$$[D]=[M][S_{in}] \qquad \text{Eq. 1}$$

The Stokes vector $[S_{in}]$ of the input light beam is obtained by inverting Eq. 1:

$$[S_{in}]=[M]^{-1}[D] \qquad \text{Eq. 2}$$

wherein $[M]^{-1}$ is the inverse of [M].

In the case where all the components have exactly the ideal specified parameters (e.g., exactly quarter-wave retardance, exactly 45° switching, etc.), then [M] and $[M]^{-1}$ are both equal to the identity matrix [I]. In such a case, $[S_{in}]=$ [D], and the measurement data directly yield the input polarization state without the need for correction.

Measurement matrix [M] is established and stored in memory (e.g., memory device 162 of controller 150). This is done, for example, when system 100 is being set up and calibrated. Since [M] is 4×4, 16 measurements are needed to establish [M]. One approach to establishing M is to start with light having four different, well known states of polarization, and then for each polarization state, make a measurement with each of the four possible states of the waveplate.

Measurement matrix [M] is expected to be a function of wavelength. Therefore, a different [M] is established and stored for each wavelength. Once this is accomplished, the wavelength-parallel output data from the system is corrected on a wavelength-by-wavelength basis, using the appropriate $[M]^{-1}$ in Eq. 2 for each wavelength.

CONCLUSION

Applications for the systems and methods of the present invention include measuring and characterizing Polarization Mode Dispersion (PMD) in multi-wavelength light beams, and controlling multi-wavelength PMD compensators using the measured PMD. The invention is also useful for providing control information for multi-wavelength polarization controllers that act to reduce polarization dependent loss (PDL) or polarization dependent crosstalk in multi-wavelength optical communication systems.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. A system for measuring the state of polarization (SOP) of wavelength components in a multi-wavelength input light beam, comprising:
   a set of two or more rapidly switchable waveplates selectively controllable to receive and operate on the input light beam to form a sequence of secondary light beams with different polarizations;
   a polarizer oriented to pass a select polarization and arranged to receive the secondary light beams and form a corresponding first sequence of polarization-filtered light beams;
   a first spectral dispersing element arranged to spatially disperse the wavelengths components of one of the input light beam, the secondary light beams and the polarization-filtered light beams; and a first detector array arranged to receive and detect the spatially dispersed wavelength components of each of the polarization-filtered light beams.

2. The system of claim 1, wherein the first spectral dispersing element is arranged downstream of the polarizer so as to spatially disperse the polarization-filtered light beams.

3. The system of claim 1, further including a controller coupled to the first detector array and to the set of rapidly switchable waveplates, the controller adapted to:
   i) rapidly switch the waveplates to selectively alter or maintain the SOP of the input light beam according to a measurement protocol;
   ii) store measured intensity values associated with the detected wavelength components of the polarization-filtered light beams; and
   iii) calculate the SOP for each wavelength component based on the stored measured intensities.

4. The system of claim 1, wherein the two or more rapidly switchable waveplates are ferroelectric liquid crystal (FLC) cells.

5. The system of claim 1, wherein the polarizer is a polarizing beam splitter adapted to reflect a portion of the secondary light beams along a reflection axis to form a second sequence of polarization-filtered light beams.

6. The system of claim 5, wherein the first spectral dispersing element is arranged upstream of the polarizing beam splitter, and wherein the system further includes:
   a second detector array coupled to the controller and arranged along the reflection axis to receive and measure the intensity of each of the spatially dispersed wavelength components.

7. The system of claim 5, wherein the first spectral dispersing element is arranged downstream of the polarizing beam splitter adjacent the first detector array, and wherein the system further includes:
   a second spectral dispersing element arranged along the reflection axis.

8. The system of claim 1, wherein the set of two or more rapidly switchable waveplates includes at least one pair of combined waveplates, with the waveplates having equal retardances, and wherein the at least one pair has an ON state wherein the retardances add, and an OFF state wherein retardances cancel.

9. The system of claim 1, wherein the select polarization of the polarizer is horizontal (0°), and wherein the set of two or more rapidly switchable waveplates comprises:
   a first waveplate pair having a 45° optic axis orientation and a retardance switchable between 0 (OFF state) and λ/4 (ON state);
   a second waveplate pair having a 22.5° optic axis orientation and a retardance switchable between 0 (OFF state) and λ/2 (ON state); and
   a third waveplate pair having a 45° optic axis orientation and a retardance switchable between 0 (OFF state) and λ/2 (ON state).

10. The system of claim 1, wherein the select polarization of the polarizer is horizontal (0°), and wherein the set of two or more rapidly switchable waveplates comprises:
    a first waveplate pair having an optic axis orientation of 67.5° and a retardance switchable between 0 (OFF state) and λ/2 (ON state);
    a first single waveplate having a retardance of λ/2 and having an optic axis orientation switchable between 90° and 45°; and
    a second single waveplate having a retardance of λ/4 and an optic axis orientation switchable between 90° and 45°.

11. The system of claim 1, wherein the select polarization of the polarizer is horizontal (0°), and wherein the set of two or more rapidly switchable waveplates comprises:
    a first single waveplate having a retardance of λ/4 and an optic axis switchable between 90° and 135°; and
    a second single waveplate having a retardance of λ/4 and an optic axis switchable between 180° and 135°.

12. The system of claim 3, wherein the input beam SOP is characterized by Stokes parameters $[S_{in}]$, the stored measured intensities for each wavelength constitute a data set [D], and wherein the controller includes a measurement matrix [M] operable on the data set [D] to determine the input beam SOP for each wavelength component via the relationship $[S_{in}]=[M]^{-1}[D]$.

13. A method of measuring the state of polarization (SOP) of an input light beam having multiple wavelength components, comprising:
    a) rapidly forming from the input light beam a sequence of secondary light beams each with a different polarization;
    b) polarization-filtering the secondary light beams;
    c) spatially dispersing the wavelength components of one of the input light beam, the secondary light beams and the polarization-filtered light beams;
    d) measuring in parallel the intensities of the wavelength components for each polarization-filtered light beam; and
    e) calculating the SOP for each wavelength component from the measured intensities.

14. The method of claim 13, wherein spatially dispersing the wavelength components includes directing the polarization-filtered light to a spectral dispersing element arranged immediately adjacent a detector array.

15. The method of claim 13, wherein the calculating the SOP for each wavelength component includes determining Stokes parameters for each wavelength component.

16. The method of claim 13, wherein rapidly forming the secondary light beams includes passing the input light beam through two or more switchable waveplates, and switching the two or more waveplates at a rate of 1 millisecond or less.

17. The method of claim 16, wherein the two or more waveplates include ferroelectric liquid crystal (FLC) cells.

18. The method of claim 16, including switching the two or more switchable waveplates according to a measurement protocol that measures intensities $I_0$, $I_{90}$, $I_{45}$ and $I_{RHC}$ corresponding to polarization directions of 0°, 90°, 45° and right-hand circular for each wavelength component.

19. The method of claim 18, further including calculating Stokes parameters from the measured intensities $I_0$, $I_{90}$, $I_{45}$ and $I_{RHC}$.

20. The method of claim 17, including arranging the two or more switchable FLC waveplates as:
    a first waveplate pair having a 45° optic axis orientation and a retardance switchable between 0 (OFF state) and λ/4 (ON state);
    a second waveplate pair having a 22.5° optic axis orientation and a retardance switchable between 0 (OFF state) and λ/2 (ON state); and
    a third waveplate pair having a 45° optic axis orientation and a retardance switchable between 0 (OFF state) and λ/2 (ON state).

21. The method of claim 20, including following a measurement protocol that includes performing measurement steps as presented in the following table:

| Step | First waveplate pair optic axis state/ orientation | Second waveplate pair optic axis state/ orientation | Third waveplate pair optic axis orientation | Result |
|---|---|---|---|---|
| 1 | OFF | OFF | OFF | $I_0$ |
| 2 | OFF | OFF | ON at 45° | $I_{90}$ |
| 3 | OFF | ON at 22.5° | OFF | $I_{45}$ |
| 4 | ON at 45° | OFF | OFF | $I_{RHC}$ |

22. The method of claim 21, wherein the measurement steps are performed in the order presented in the table.

23. The method of claim 17, including arranging the two or more switchable FLC waveplates as:
   a first waveplate pair having a an optic axis orientation of 67.5° and a retardance switchable between 0 (OFF state) and $\lambda/2$ (ON state);
   a first single waveplate having a retardance of $\lambda/2$ retardance and an optic axis switchable between 90° and 45°; and
   a second single waveplate having a retardance of $\lambda/4$ and an optic axis switchable between 90° and 45°.

24. The method of claim 23, including following a measurement protocol that includes performing measurement steps as presented in the following table:

| Step | First waveplate pair optic axis orientation/state | First single waveplate optic axis orientation | Second single waveplate optic axis orientation | Result |
|---|---|---|---|---|
| 1 | OFF | 90° | 90° | $I_0$ |
| 2 | OFF | 45° | 90° | $I_{90}$ |
| 3 | ON at 67.5° | 45° | 90° | $I_{45}$ |
| 4 | OFF | 90° | 45° | $I_{RHC}$ |

25. The method of claim 24, wherein the measurement steps are performed in the order presented in the table.

26. The method of claim 17, including arranging the two or more switchable FLC waveplates as:
   a first single waveplate having a retardance of $\lambda/4$ and an optic axis switchable between 90° and 135°; and
   a second single waveplate having a retardance of $\lambda/4$ and an optic axis switchable between 180° and 135°.

27. The method of claim 26, including following a measurement protocol that includes performing measurement steps as presented in the following table:

| Step | First single waveplate optic axis orientation | Second single waveplate optic axis orientation | Result |
|---|---|---|---|
| 1 | 90° | 180° | $I_0$ |
| 2 | 135° | 135° | $I_{90}$ |
| 3 | 90° | 135° | $I_{45}$ |
| 4 | 135° | 180° | $I_{RHC}$ |

28. The method of claim 27, wherein the measurement steps are performed in the order presented in the table.

29. The method of claim 13, wherein calculating the SOP for each wavelength includes compensating for SOP measurement errors.

30. The method of claim 29, wherein the input beam SOP is characterized by Stokes parameters $[S_{in}]$, the stored measured intensities for each wavelength constitute a data set $[D]$, and wherein compensating for measurement errors includes:
   forming measurement matrix $[M]$ operable on the data set $[D]$; and determining the input
   beam SOP for each wavelength component via the operation $[S_{in}]=[M]^{-1}[D]$.

* * * * *